(12) United States Patent
Lennard et al.

(10) Patent No.: US 9,480,208 B2
(45) Date of Patent: Nov. 1, 2016

(54) OFFSITE IRRIGATION CONTROLLER

(71) Applicant: Lennard Technologies, LLC, Samaria, MI (US)

(72) Inventors: Kyle J. Lennard, Sturgis, MI (US); Keith M. Lennard, Akron, OH (US)

(73) Assignee: Lennard Technologies, LLC., Samaria, MI (US)

( * ) Notice: Subject to any disclaimer, the term of this patent is extended or adjusted under 35 U.S.C. 154(b) by 85 days.

(21) Appl. No.: 14/515,067

(22) Filed: Oct. 15, 2014

(65) Prior Publication Data

US 2016/0106046 A1    Apr. 21, 2016

(51) Int. Cl.
*B05B 3/00* (2006.01)
*A01G 25/09* (2006.01)
*A01G 25/16* (2006.01)

(52) U.S. Cl.
CPC ............ *A01G 25/092* (2013.01); *A01G 25/16* (2013.01)

(58) Field of Classification Search
CPC ........................... A01G 25/092; A01G 25/16
USPC .......... 239/69, 726, 728, 1; 700/284; 701/50
See application file for complete search history.

(56) References Cited

U.S. PATENT DOCUMENTS

| | | | |
|---|---|---|---|
| 5,927,603 A * | 7/1999 | McNabb | A01G 25/092 239/728 |
| 6,512,992 B1 * | 1/2003 | Fowler | A01G 25/092 701/50 |
| 7,050,887 B2 | 5/2006 | Alvarez | |
| 7,203,576 B1 | 4/2007 | Wilson et al. | |
| 8,279,080 B2 | 10/2012 | Pitchford et al. | |
| 2013/0008977 A1 | 1/2013 | Pfrenger et al. | |
| 2013/0085619 A1 | 4/2013 | Howard | |
| 2013/0090766 A1 | 4/2013 | Pfrenger | |
| 2013/0207815 A1 | 8/2013 | Pitchford et al. | |
| 2014/0039695 A1 | 2/2014 | Andrews | |
| 2014/0039696 A1 | 2/2014 | Andrews | |

* cited by examiner

*Primary Examiner* — Steven J Ganey
(74) *Attorney, Agent, or Firm* — Taylor IP, P.C.

(57) ABSTRACT

A center pivot irrigation system including a framework, a fluid conduit supported by the framework, a plurality of fluid-emitting nozzles associated with the fluid conduit, and a central control panel. Further, the irrigation system has an offsite irrigation controller, including a fluid-pressure sensor for sensing the fluid pressure inside the fluid conduit and a digital compass for monitoring the orientation of the irrigation system as it rotates about the center pivot axis. The offsite irrigation controller also includes a remote transmitter for communicating to an offsite receiver and an electrical processing circuit coupled with the fluid-pressure sensor, the digital compass, and the remote transmitter. The electrical processing circuit receives an output signal from each of the fluid-pressure sensor and the digital compass, and controls the remote transmitter to transmit the operational status of the irrigation system to an offsite user.

4 Claims, 3 Drawing Sheets

OFFSITE IRRIGATION CONTROLLER

BACKGROUND OF THE INVENTION

1. Field of the Invention

The present invention relates to agricultural irrigation systems, and more particularly to a controller and method to remotely monitor and control irrigation systems.

2. Description of the Related Art

Mobile irrigation systems in the agricultural industry generally include a pressurized water system formed from elevated fluid conduits supported by mobile support towers on wheels interlocked with truss-type framework sections. The fluid conduits have a plurality of sprinkler heads, spray heads, drop nozzles, or other fluid-emitting devices along the fluid conduit, via fittings, drop lines, etc. These fluid conduits have access to a well or other sources of water and may also be coupled to another source of chemical products, for example fertilizers or pesticides. As the fluid is being emitted, in order to irrigate the various sections of the field, an electric or hydraulic motor typically drives the respective wheels of the mobile support towers. There are two generic types of irrigation systems: lateral type irrigation systems and central pivot irrigation systems. Lateral type irrigation systems follow a linear path across the field. Central pivot irrigation systems rotate about a central pivot point, traveling in an arc or a circular motion.

Modern irrigation systems include control systems to operate the irrigation system in its entirety. A control system can be programed to automatically manipulate multiple functions including hours of operation, movement, fluid pressure, start positions, and end positions. Many control systems and user interfaces are located on the premises, and thus must be manually governed locally. Other control systems remotely communicate to the user and operate the irrigation system without the need of the user to be in close proximity. Remote communication is generally coupled with a wide area network, which could include radio communication or wireless Internet communication. These systems are usually costly and generally are installed by a technician, as opposed to the farmer.

What is needed in the art is a cost effective irrigation controller that monitors the fluid pressure and orientation of a central pivot irrigation system, and communicates the status of the irrigation system to an offsite user.

SUMMARY OF THE INVENTION

The present invention provides an offsite irrigation controller and a method to remotely monitor fluid pressure and orientation of an irrigation system. The offsite irrigation controller uses a fluid-pressure sensor to monitor the pressure inside the fluid conduits, and a digital compass to track the irrigation system's orientation. The offsite irrigation controller receives the information from the fluid-pressure sensor and the digital compass, and then categorizes and communicates that information to an offsite user.

The invention in one form is directed to an irrigation system including a framework rotatable about a center pivot axis, a fluid conduit supported by the framework, a plurality of fluid-emitting nozzles associated with the fluid conduit, and a central control panel. The irrigation system also includes an offsite irrigation controller, which includes a fluid-pressure sensor for sensing a fluid pressure inside the fluid conduit and a digital compass for monitoring the orientation of the irrigation system as it rotates about the center pivot axis. The offsite irrigation controller further includes a remote transmitter for communicating to an offsite receiver, and an electrical processing circuit coupled with the fluid-pressure sensor, the digital compass, and the remote transmitter. The electrical processing circuit receives an output signal from each of the fluid-pressure sensor and the digital compass, and controls the remote transmitter to transmit the operational status of the irrigation system to an offsite user, dependent upon the received signals.

The invention in another form is directed to an offsite irrigation controller, which includes a fluid-pressure sensor for sensing a fluid pressure inside the fluid conduit and a digital compass for monitoring the orientation of the irrigation system as it rotates about the center pivot axis. The offsite irrigation controller further includes a remote transmitter for communicating to an offsite receiver, and an electrical processing circuit coupled with the fluid-pressure sensor, the digital compass, and the remote transmitter. The electrical processing circuit receives an output signal from each of the fluid-pressure sensor and the digital compass, and controls the remote transmitter to transmit the operational status of the irrigation system to an offsite user, dependent upon the received signals.

The invention in yet another form is directed to a method of operating an irrigation system by using an offsite irrigation controller. The irrigation system includes a framework rotatable about a center pivot axis, a fluid conduit supported by the framework, a plurality of fluid-emitting nozzles associated with the fluid conduit, and a central control panel for controlling a flow of fluid within the fluid conduit. The method includes the steps of sensing a fluid pressure inside the fluid conduit using a fluid-pressure sensor, monitoring an angular orientation of the irrigation system relative to a center pivot axis using a digital compass, and transmitting an operational status of the irrigation system to an offsite user.

An advantage of the present invention is that it can be easily installed by a layperson.

Another advantage of the present invention is its reduced cost and minimized complexity compared to other irrigation system controllers.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
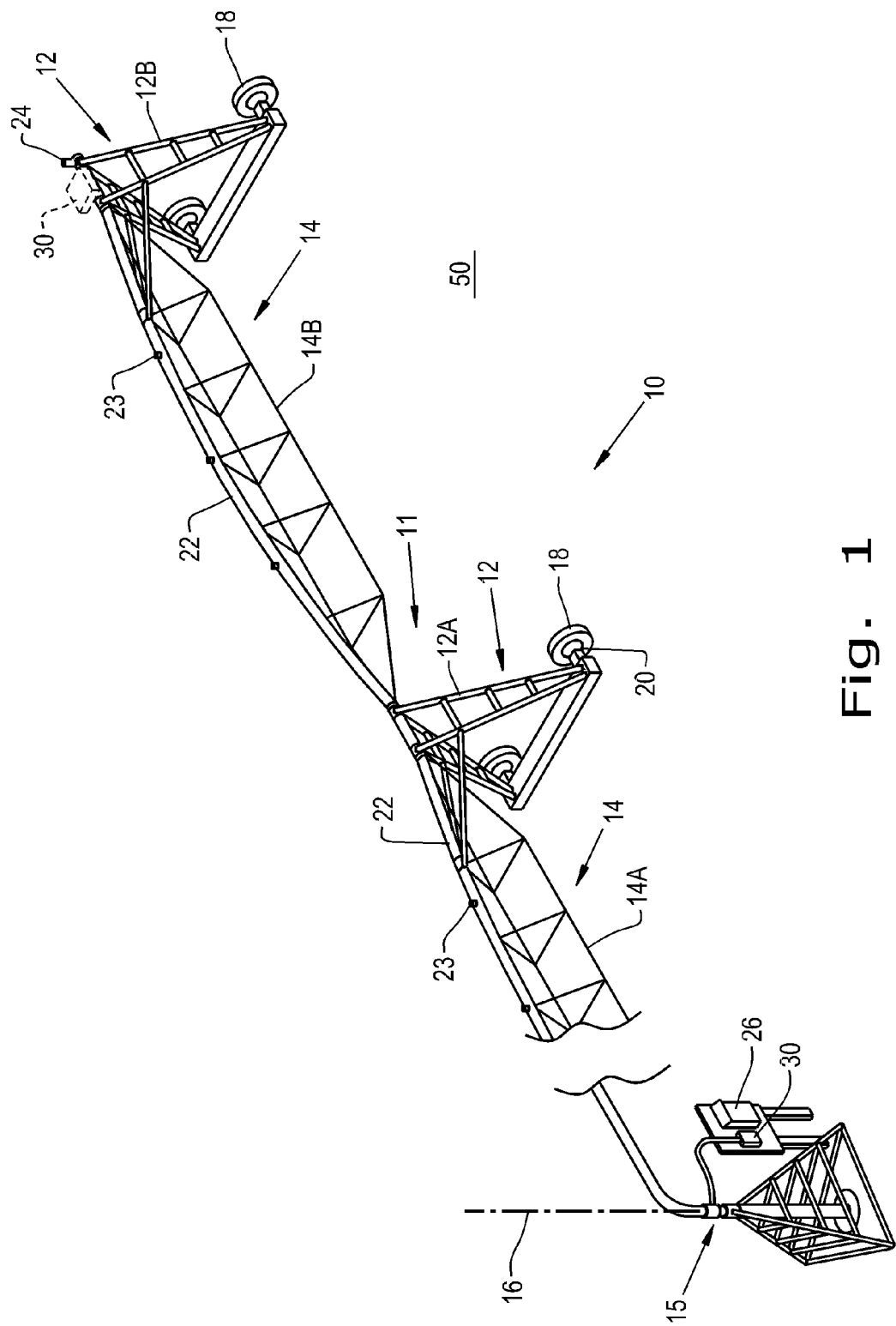
FIG. 1 is a top perspective view of an example of a typical central pivot irrigation system including an embodiment of an offsite irrigation controller of the present invention.

Referring now to FIG. 1, there is shown an example of a central pivot irrigation system 10 which generally includes a center anchor frame 15, a framework 11, fluid conduits 22, a control panel 26, and an offsite irrigation controller 30. The framework 11 generally includes mobile support towers 12 and truss-type support sections 14. The radially inner truss-type support section 14A is connected in between the center anchor frame 15 and the radially innermost mobile support tower 12A. To stretch a set length of the field 50, truss-type support sections 14 connected to mobile support towers 12 are linked together in succession, and the succession ends with the radially outermost support tower 12B. Some irrigation systems include a foldable corner system in which the outermost truss-type support section 14B connected to the outermost support tower 12B is able to swivel relative to the preceding framework to which it connects. The mobile support towers are supported by wheels 18, at least one of which is driven by an electric motor 20, causing the irrigation system to travel in a circular path about the center pivot axis 16 in order to irrigate the field 50. The operation of the motors is generally controlled by well-known methods in the art.

The fluid conduits 22, supported by the framework 11, include a plurality of fluid-emitting nozzles 23 including sprinkler heads, spray guns, or drop nozzles. The irrigation system 10 may also include one or more high-pressure sprayers or spray guns 24 mounted on the radially outermost or end mobile support tower 12B. These guns are integrated to provide an increased effective radius and to assist with reaching the outermost corners of the field 50 or other designated areas that would not otherwise be irrigated without them.

The irrigation system 10 may also include a central control panel 26 for controlling the electric motors 20, which drive the wheels 18 to move the mobile support towers 12. The central control panel 26 may also include outputs coupled with a water supply source (e.g., a pump) to start or stop the flow of fluid within the fluid conduits 22.

Figure 2:
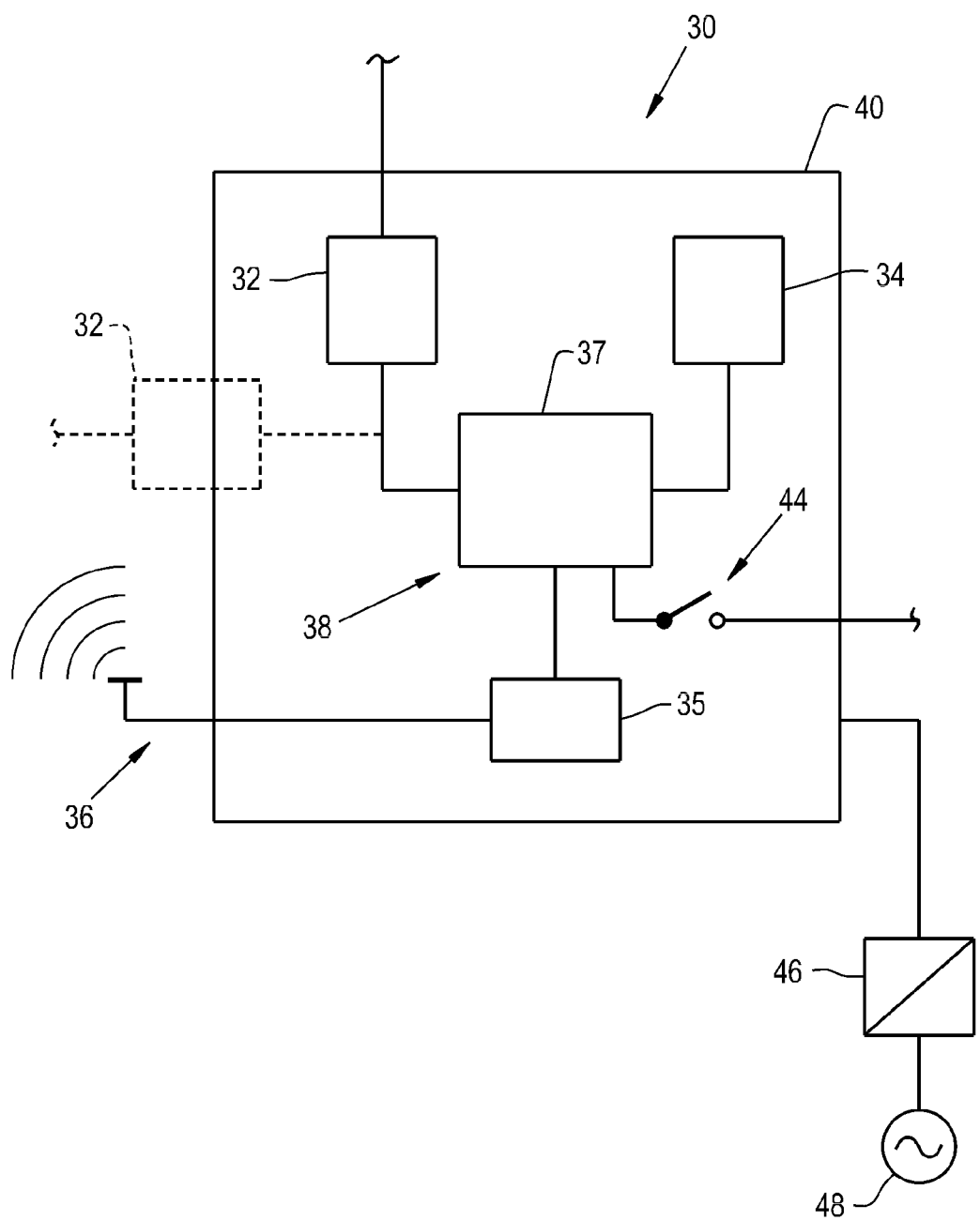
FIG. 2 is a block diagram of an embodiment of the offsite irrigation controller shown in FIG. 1.

According to an aspect of the present invention, and referring to FIGS. 1 and 2 conjunctively, the irrigation system 10 of the present invention includes an offsite irrigation controller 30 for sensing fluid pressure within the fluid conduits 22, monitoring an orientation of the mobile support towers 12, and communicating an operational status to an offsite user. The offsite irrigation controller 30 can be partially located on the backpanel that carries the central control panel 26, such as shown in FIG. 1, with some of the components (discussed below) located on the support sections 14. Alternatively, the offsite irrigation controller 30 can be located at a different suitable location on the irrigation system 10, such as adjacent to the end tower 12B (shown in dashed lines in FIG. 1).

Referring now to FIG. 2, the offsite irrigation controller 30 generally includes a housing 40, which houses a fluid pressure sensor 32, a digital compass 34, a remote transmitter 36, and an electrical processing circuit 38. The fluid-pressure sensor 32 is coupled to the electrical processing circuit 38 and is in communication with a pressurized fluid at any suitable location within and along the fluid conduit 22. The fluid pressure sensor 32 is preferably located within the housing 40, and alternative may be located partially within the housing 40, or exterior of the housing 40 at any other suitable location along the fluid conduits 22.

The digital compass 34, coupled to the electrical processing circuit 38, monitors the orientation of the irrigation system relative to magnetic north. The illustrated embodiment includes a tilt-compensated digital compass as its digital compass 34, however this is not to limit the scope of the invention, and any kind of a digital compass may be used. The digital compass 34 is attached at a location on the irrigation system 10 such that it rotates with and thereby can sense the angular orientation of the irrigation system 10. The digital compass 34 can be located in the housing 40 (if the housing is mounted to the framework 11), or alternatively exterior of the housing 40 and attached to the irrigation framework 11 at a convenient location.

The remote transmitter 36 is located within housing 40, and is coupled with the electrical processing circuit, which corresponds to an offsite receiver (not shown). In the present invention the remote transmitter is a cellular module 35 that communicates with a remote computer server (not shown). The remote server in turn generates a web page that can be displayed on a computer or mobile device that can be accessed by the end user. The remote transmitter may also be configured as a radio transmitter (e.g., RF) or a wireless Internet transmitter.

The electrical processing circuit 38 in the present invention is shown as a microprocessor 37. However, the electrical processing circuit 38 can be configured as any type of suitable processor, such as a digital controller, an analog processor, hardwired components or an application specific integrated circuit (ASIC). The microprocessor 37 receives and categorizes information from the fluid-pressure sensor 32 and digital compass 34. It then relays this information to the cellular module 35 which communicates with the remote computer server. The remote server in turn generates a web page that can be displayed on a computer or mobile device that can be accessed by the end user. The microprocessor 37 is also coupled with the relay switch 44 that can turn off the irrigation system by causing the controller to trip the relay switch 44, which causes the safety wire inside the relay switch to "break", cutting off the power to the irrigation system 10.

The offsite irrigation controller includes an AC/DC converter 46 which is connected to a power source 48. The power source 48 of the illustrated embodiment includes a solar panel and a 12V battery (not shown). If any current exceeds the offsite irrigation controller's power usage needs, the excess energy can be stored in the battery in the event the other power source is disrupted. The power source 48 may also be connected to the same AC electrical power source that powers the irrigation system 10.

Figure 3:
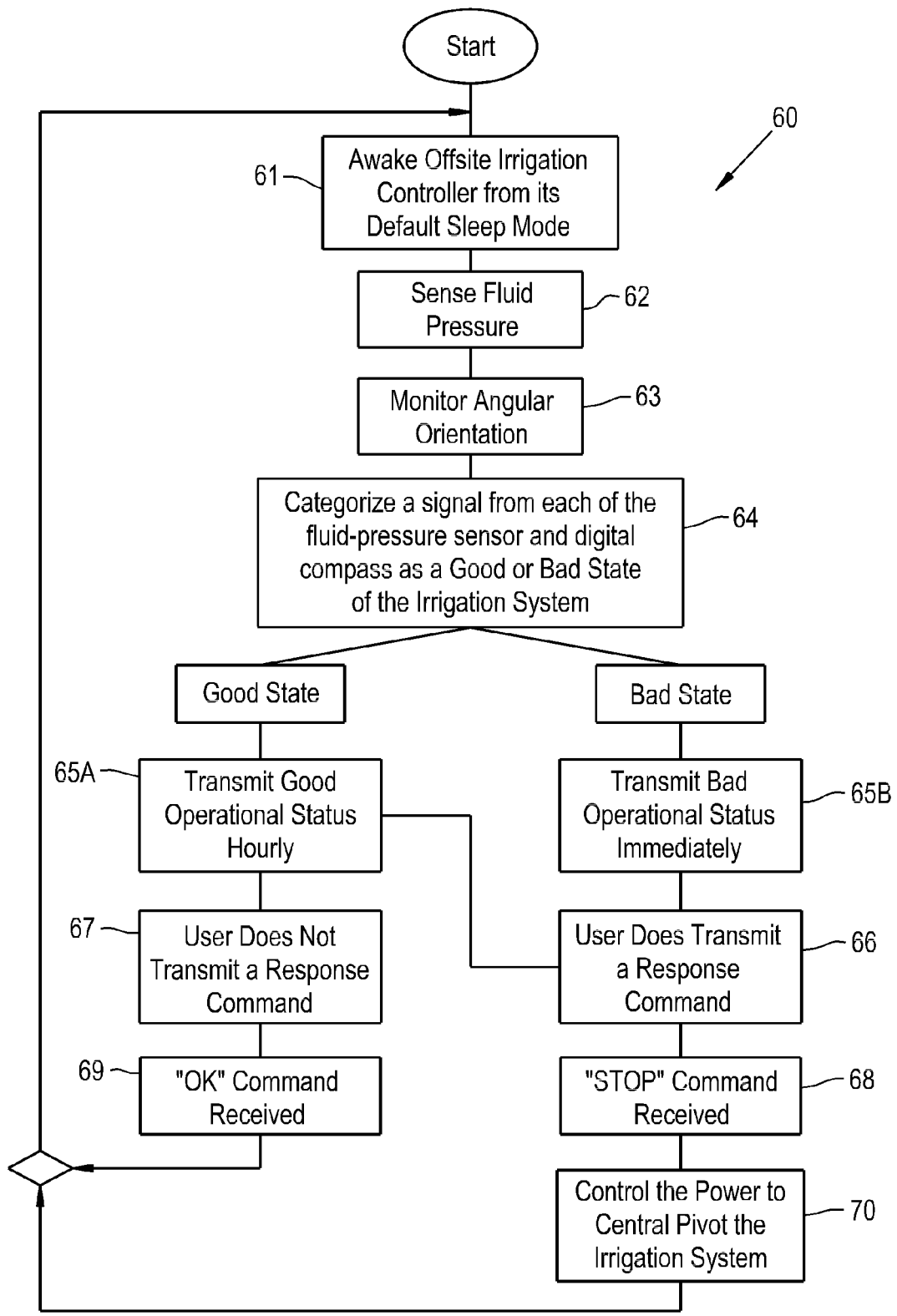
FIG. 3 is a flowchart of a method of operation of the offsite irrigation controller shown in FIGS. 1 and 2.

According to another aspect the present invention and referring to FIGS. 3 and 4 conjunctively, the method 60 includes sensing fluid pressure 62 in the fluid conduit by using the fluid-pressure sensor 32, monitoring the irrigation system's angular orientation 63 by using the digital compass 34, and transmitting the operational status 65A or 65B of the irrigation system to the offsite user via the cellular module 35. The method 60 is designed to be energy efficient by conserving power in checking the signals from each of the fluid-pressure sensor 32 and digital compass 34 in programed intervals, as well as in sending out transmissions to the user's offsite receiver in programed intervals. By default the controller is in a low-power sleep mode. Every fifteen minutes the controller "awakes" 61 to evaluate the fluid pressure 62 and angular orientation 63 of the irrigation system. The microprocessor 37 categorizes the irrigation system in one of two states 64. The irrigation system is in a "good" state if it is detected that the irrigation system has either (A) moved since the previous evaluation and there is adequate fluid pressure which corresponds to an operating state, or (B) the irrigation system has not moved and there is no fluid pressure which means the irrigation system is dormant. The irrigation system is in a "bad" state if it is detected either (C) the irrigation system has moved since its last evaluation and there is no fluid pressure, or (D) the irrigation system has not moved and there is adequate fluid pressure.

The transmitting intervals are preprogramed into the microprocessor 37. When the offsite irrigation controller detects that the irrigation system is in a good state, it will send the operational status update to the user every hour 65A. When the offsite irrigation controller detects a bad state, it will send out the operational status immediately 65B at a predetermined interval (e.g., every 15 minutes).

Once the transmission has been sent, the controller waits for a response command. If the irrigation system is a good state and the user does not enter a response command 67, then the microprocessor 37 receives an "OK" command 69, and the microprocessor will let the irrigation system continue as normal. If the user enters a response command to shut down the irrigation system 66, the microprocessor 37 receives a "STOP" command 68. Then the microprocessor 37 will control the power 70 by tripping the relay switch 44 to shut off the power to irrigation system 10.

The offsite irrigation controller is designed to be easily installable. It is self-contained within its housing 40 in order to keep installation costs at a minimum. The offsite irrigation controller was designed cost-efficiently and built to last to provide a farmer with years of quality use, enabling the farmer to leave the field and still monitor the irrigation system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of operating an irrigation system using an offsite irrigation controller, the irrigation system including a framework rotatable about a center pivot axis, a fluid conduit supported by said framework, a plurality of fluid-emitting nozzles associated with said fluid conduit, and a central control panel, the method comprising the steps of:
   sensing a fluid pressure inside the fluid conduit using a fluid-pressure sensor;
   monitoring an angular orientation of the irrigation system relative to said center pivot axis using a digital compass;
   categorizing a signal from each of said fluid-pressure sensor and said digital compass as either a "good" or a "bad" state of said irrigation system; and
   transmitting an operational status of said irrigation system to an offsite user.

2. The method of claim 1, including a further step of awakening said offsite irrigation controller at a predetermined interval from a default low-power sleep mode for sensing and monitoring said irrigation system.

3. The method of claim 1, wherein said transmitting step includes an interval of every hour if said operational status is "good" or a predetermined interval if said operational status is "bad".

4. The method of claim 1, including a further step of transmitting a response command from said offsite user, receiving said response command at said offsite irrigation controller, and controlling a power input to said irrigation system, dependent upon said response command from the user.

* * * * *